United States Patent [19]

Nakaya et al.

[11] Patent Number: 4,933,892
[45] Date of Patent: Jun. 12, 1990

[54] INTEGRATED CIRCUIT DEVICE FOR ORTHOGONAL TRANSFORMATION OF TWO-DIMENSIONAL DISCRETE DATA AND OPERATING METHOD THEREOF

[75] Inventors: Masao Nakaya; Hideki Ando, both of Hyogo, Japan

[73] Assignee: Mitsubishi Denki Kabushiki Kaisha, Tokyo, Japan

[21] Appl. No.: 390,997

[22] Filed: Aug. 9, 1989

[30] Foreign Application Priority Data

Oct. 4, 1988 [JP] Japan .................. 63-251073

[51] Int. Cl.[5] .............................. G06F 7/38
[52] U.S. Cl. .................................... 364/725
[58] Field of Search ............ 364/725, 726, 754; 382/43

[56] References Cited

U.S. PATENT DOCUMENTS

| | | | |
|---|---|---|---|
| 4,293,920 | 10/1981 | Merola | 364/725 |
| 4,446,530 | 5/1984 | Tsuboka | 364/725 |
| 4,807,042 | 2/1989 | Tanaka | 364/725 X |
| 4,831,440 | 5/1989 | Borgers et al. | 364/725 X |

Primary Examiner—Gary V. Harkcom
Assistant Examiner—Tan V. Mai
Attorney, Agent, or Firm—Lowe, Price, LeBlanc, Becker & Shur

[57] ABSTRACT

The device, for performing an orthogonal transformation of two dimensional discrete data array of n x n matrix at a high speed, includes a first block including storage elements for storing individual elements of a matrix for orthogonal transformation, a second block including storage elements for storing a data array therein, and a third block including a plurality of storage elements for storing a result of a multiplication therein, and n x n pointer registers each making a shifting operation in the row direction. When the pointer registers are reset, only diagonal elements thereof produce an activating signal. The device further includes circuitry for selecting a response to a signal from the pointer block, particular ones of the elements of the first, second and third blocks, multiplying contents of the selected elements of the first and second blocks, and adding a result of the multiplication to contents of the selected element of the third block and writing a result of the addition back into the selected elements of the third block. The device further includes a shifting clock generator which sets the shifting direction of the first and second storage blocks. After completion of the first matrix multiplication, result of the multiplication is transferred from the third storage block to the second storage block. Upon second matrix multiplication, shifting operations of the first and second blocks are performed in directions different from the directions in the first matrix multiplication.

19 Claims, 17 Drawing Sheets $m_i$ : FROM THE MULTIPLIER
$C_i$-OUT: FROM THE 3RD STORAGE BLOCK
$C_i$-IN : TO THE 3RD STORAGE BLOCK

FIG.15A

INITIAL VALUE

B
```
11 12 13 14      21 22 23 24      31 32 33 34      41 42 43 44
21 22 23 24 ④   31 32 33 34 ⑧   41 42 43 44 ⑫   11 12 13 14
31 32 33 34  →  31 32 33 34  →  11 12 13 14  →  21 22 23 24
41 42 43 44      11 12 13 14      21 22 23 24      31 32 33 34
```

A     INITIAL VALUE
```
11 12 13 14     12 13 14 11     13 14 11 12     14 11 12 13
21 22 23 24 ④  22 23 24 21 ⑧  23 24 21 22 ⑫  24 21 22 23
31 32 33 34  → 32 33 34 31  → 33 34 31 32  → 34 31 32 33
41 42 43 44     42 43 44 41     43 44 41 42     44 41 42 43
    ↓①              ↓⑤              ↓⑨              ↓⑬
14 11 12 13     11 12 13 14     12 13 14 11     13 14 11 12
24 21 22 23     21 22 23 24     22 23 24 21     23 24 21 22
34 31 32 33     31 32 33 34     32 33 34 31     33 34 31 32
44 43 42 43     41 42 43 44     42 43 44 41     43 44 41 42
    ↓②              ↓⑥              ↓⑩              ↓⑭
13 14 11 12     14 11 12 13     11 12 13 14     12 13 14 11
23 24 21 22     24 21 22 23     21 22 23 24     22 23 24 21
33 34 31 32     34 31 32 33     31 32 33 34     32 33 34 31
43 44 41 42     44 41 42 43     41 42 43 44     42 43 44 41
    ↓③              ↓⑦              ↓⑪              ↓⑮
12 13 14 11     13 14 11 12     14 11 12 13     11 12 13 14
22 23 24 21     23 24 21 22     24 21 22 23     21 22 23 24
32 33 34 31     33 34 31 32     34 31 32 33     31 32 33 34
42 43 44 41     43 44 41 42     44 41 42 43     41 42 43 44
```

INTEGRATED CIRCUIT DEVICE FOR ORTHOGONAL TRANSFORMATION OF TWO-DIMENSIONAL DISCRETE DATA AND OPERATING METHOD THEREOF

BACKGROUND OF THE INVENTION

1. Field of the Invention

This invention relates to a circuit device for orthogonally transforming two-dimensional discrete data such as image data, and more particularly to an orthogonal transformation device of a compact construction and operating method thereof by which discrete data arranged in a square lattice can be orthogonally transformed at a high speed.

2. Description of the Background Art

One of techniques of filter processing on two-dimensional discrete data such as image data is orthogonal transformation such as Fourier transformation or Hadamard transformation. Discrete Fourier transformation (DFT) is given by $$G(k\Omega 1, l\Omega 2) = \sum_{m=0}^{M-1} \sum_{n=0}^{N-1} g(mx0, ny0) W1^{mk} W2^{nl}$$

where $\Omega 1 = 2\pi/Mx0$, $W1 = \exp(-2\pi j/M)$, $\Omega 2 = 2\pi/Ny0$, $W2 = \exp(-2nj/N)$, $x0$ is a sampling distance in the x direction in two-dimensional sampling space, and $y0$ is a sampling distance in the y direction in two-dimensional sampling space. When such discrete Fourier transformation is represented in determinant, it is given by $$[G] = [W1][g][W2]$$

In the case that the two-dimensional data array [g] is a square lattice of p×p (p rows and p columns), then $W1 = W2$ and $M = N$ in the equation above, and in this instance, the Fourier transformation matrix W becomes a symmetric matrix. Accordingly, DFT [G] can be written as $$[G] = [W][g][W]^T = [W][g][W]; \text{ T: transposition.}$$

For example, assuming $M = N = 3$, and $x0 = y0 = a$, then, the following is obtained:

$$w = w1 = w2 = \exp(-2\pi j/3)$$

Thus, $$G(k\Omega, l\Omega) = \sum_{m=0}^{2} \sum_{n=0}^{2} g(ma, na) W^{mk} W^{nl}$$

$$= \sum_{n=0}^{2} \sum_{m=0}^{2} W^{mk} g(ma, na) W^{nl}$$

$$= \sum_{n=0}^{2} \{g(0, na) + W^k g(a, na) + W^{2k} g(2a, na)\} W^{nl}$$

$$= (1, W^k, W^{2k}) \begin{pmatrix} g(0, 0), g(0, a), g(0, 2a) \\ g(a, 0), g(a, a), g(a, 2a) \\ g(2a, 0), g(2a, a), g(2a, 2a) \end{pmatrix} \times \begin{pmatrix} 1 \\ W \\ W^2 \end{pmatrix}$$

Then, the following representation is obtained, $$[G] = \begin{bmatrix} 1 & 1 & 1 \\ 1 & W & W^2 \\ 1 & W^2 & W^4 \end{bmatrix} [g] \begin{bmatrix} 1 & 1 & 1 \\ 1 & W & W \\ 1 & W^2 & W^4 \end{bmatrix}$$

$$= [W][g][W]^T = [W][g][W]$$

Meanwhile, Hadamard transformation is given similarly by $$Y = Hn \: X \: Hn \cdot 1/n$$

where Hn is a natural Hadamard matrix of degree n, and X is an n×n two-dimensional discrete data array.

Conventionally, FFT (fast Fourier transform) or FHT (fast Hadamard transform) is employed for such orthogonal transformation operation of a two-dimensional discrete data array.

In order to accomplish such conventional orthogonal transformation of a two-dimensional data array as described above, a multiplication of matrices must be performed twice. A multiplication of square matrices is conventionally executed in accordance with software using a computer. In performing a multiplication of square matrices in accordance with software, however, sequential steps of reading out data from a memory or a register, multiplying and adding data thus read out and storing results of the calculations into the memory or the register are required. Accordingly, there is a problem that a long period of time is required for such calculations and high speed processing cannot be attained. This also applies where such calculations are performed in accordance with a high speed transformation algorithm of FFT, FHT or the like because the number of additions and/or subtractions is required at least $n\log_2 n$ times. Accordingly, even with software processing in accordance with a conventional high speed transformation algorithm, there is a problem that a long period of time is required for multiplication of matrices and real-time processing of image data or the like cannot be achieved.

Also, where a discrete matrix arithmetic device is constructed in hardware using a scalar arithmetic units, the number of wires for interconnecting the arithmetic units increases in accordance with the number of elements of matrices, and the construction of the device is accordingly increased in scale and complicated. The degree thereof increases as an exponential function as the numbers of rows and columns of a discrete data array increase. Further, the length of wires from a data (matrix element) inputting circuit to a calculation result (multiplication result) outputting circuit is increased, which will cause a significant delay in signal transmission. Consequently, there is a problem that a multiplication of matrices cannot be achieved at a high speed.

On the other hand, a two-dimensional discrete Fourier transformation calculating device is disclosed in Japanese Patent Laying-Open Gazette No. 56-14371. The calculating device employs a technique wherein a multiplication of matrices is developed into a polynomial and individual transformation elements are calculated in accordance with the polynomial. Consequently, the construction of the device is complicated and increased in scale and a large number of calculations are required, and accordingly, prior art device cannot execute high speed calculations.

Accordingly, there has been a strong need for realization of a hardware device by which orthogonal transformation of a two-dimensional discrete data array can be executed at a high speed with hardware construction has been expected intensely in a field of image processing or the like wherein image data need be processed on the real-time basis.

SUMMARY OF THE INVENTION

It is an object of the present invention to provide an orthogonal transformation device of two-dimensional discrete data which is compact in construction and can execute orthogonal transformation of square matrices consisting of two-dimensional discrete data at a high speed.

It is another object of the invention to provide an operating method of the device.

In order to attain the object, according to the present invention, there is provided a circuit device for orthogonal transformation of two-dimensional discrete data arranged in a square matrix of n rows and n columns, n being a natural number, which includes a first storage means including a plurality of predetermined storage elements for storing individual elements of a coefficient matrix for orthogonal transformation on the one by one correspondence basis therein, the coefficient matrix being a square matrix of n rows and n columns, a second storage means including a plurality of storage elements for storing data arranged in a square matrix of n rows and n columns on the one by one correspondence basis therein. The transformation device also includes a third storage means including a plurality of storage elements for storing therein a result of multiplication between the data matrix stored in the second storage means and the coefficient matrix stored in the first storage means. A pointer means is also included in the transformation device for producing (1) information of a position of one of the storage elements included in the first storage means in which an element of the coefficient data in the i-th row and the k-th column is to be stored, i being an integer equal to or greater than 1 and equal to or smaller than n, k being equal to or greater than 1 equal to or smaller than n, (2) information of a position of one of the storage elements included in the second storage means in which an element of the array data in the k-th row and the l-th column is to be stored, k being an integer than 1 and equal to or smaller than n, l being equal to or greater than 1 and equal to or smaller than n, and (3) information of a position of one of the storage elements included in the third storage elements in which an element of a matrix of a result of a multiplication in the i-th row and the l-th column is to be stored. The transformation device further includes a multiplying means operable in response to position information produced from the pointer means for reading and multiplying information of those of the storage elements of the first and second storage means specified by the pointer means, an adding means for reading information of that one of the storage elements of the third storage means specified by the pointer means, adding a result of the multiplication by the multiplying means to the data read out from the specified storage element of the third storage means, and storing a result of the addition into the specified storage element of the third storage means, and a transferring means for transferring all of the results of the multiplications stored in the third storage means to the second storage means in parallel. The transferring means transferring data of the results of the multiplications on a one to one correspondence basis to the individual storage elements of the second storage means.

With the circuit device, orthogonal transformation of a two-dimensional discrete data array is attained by executing a matrix multiplication of $$[G]=[A][g][A] \qquad (1)$$

where [g] is data arranged in a two-dimensional n×n square matrix, and [A] is a square matrix for orthogonal transformation.

In order to effect orthogonal transformation, the equation (1) above can be rewritten as follows.

$$[G]=[B][A] \qquad (2)$$

$$[B]=[A][g] \qquad (3)$$

Accordingly, in order to execute orthogonal transformation of the two-dimensional discrete data array [g], a matrix multiplication must be executed only twice. Thus, in order to calculate the equation (3) above, the second storage means stores the two-dimensional discrete data matrix [g] of n rows and n columns therein while the first storage means stores the coefficient matrix [A] of n rows and n columns for orthogonal transformation. The pointer means produces information of a position of a matrix element of the matrix [g] stored in the second storage means and information of a position of a storage element of the coefficient matrix [A] stored in the first storage means, which are to be multiplied to each other. The multiplying and writing make multiplications and additions of the individual elements of the matrices in response to outputs of the pointer means and deliver a square matrix [B] of n rows and n columns obtained as a result of such multiplications and additions in the third storage means so as to be stored into the third storage means. The individual elements of the matrix [B] stored in the third storage means are transferred in parallel to the second storage means. Accordingly, after execution of the multiplication of the matrices [A] [g], the matrix [B] stored in the third storage means are transferred again to the second storage means, and then the multiplication of the equation (2) above is executed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 15A and 15B are schematic representations illustrating shifting operation of contents of individual storage elements in the coefficient matrix storage block and the data matrix storage block of the orthogonal transformation device of FIG. 1, respectively; and FIGS. 16A to 16C illustrates calculation operation according to another embodiment of the present invention.

DETAILED DESCRIPTION OF THE PREFERRED EMBODIMENTS

Figure 1:
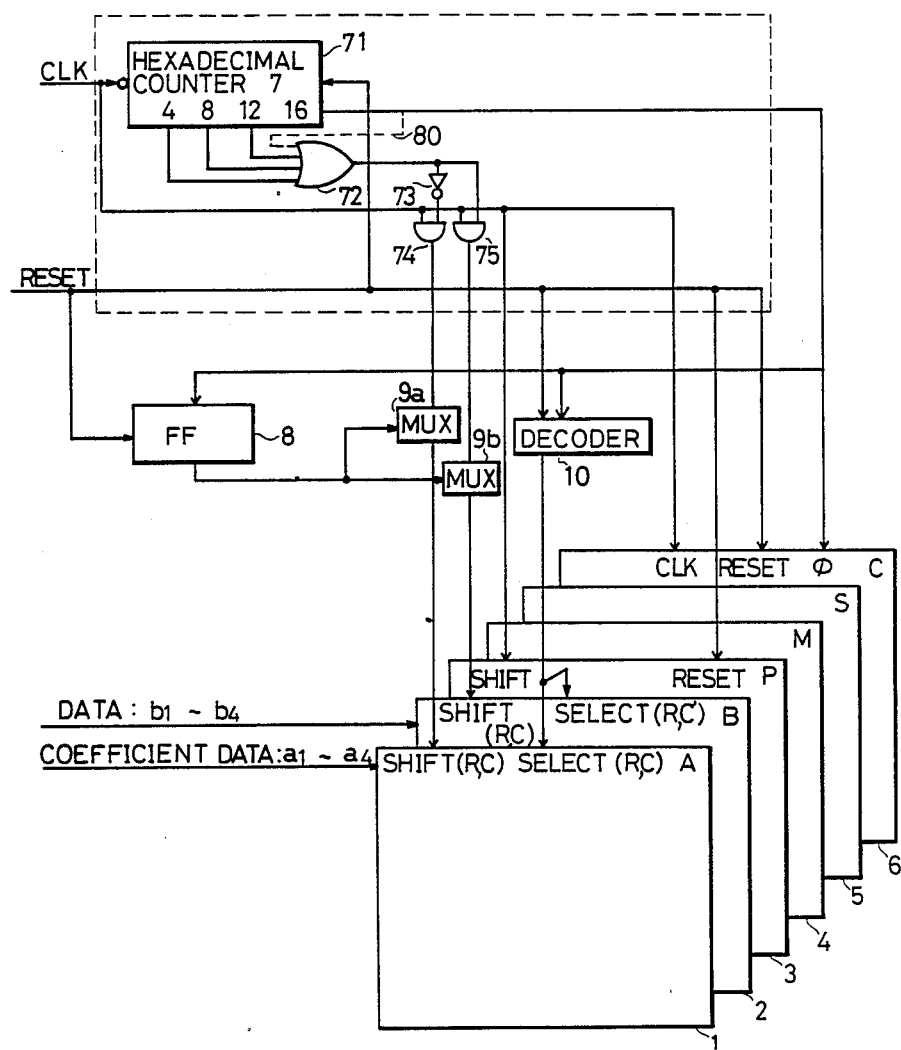
FIG. 1 is a diagrammatic representation schematically showing an entire construction of an orthogonal transformation device according to the present invention.

Referring first to FIG. 1, there is shown a schematic construction of an entire square matrix orthogonal transformation device according to a preferred embodiment of the present invention. The square matrix orthogonal transformation device shown is designed to execute orthogonal transformation of a square matrix B using another square matrix A for orthogonal transformation, that is, $[G]=[A][B][A]$.

The two-dimensional discrete data orthogonal transformation device shown in FIG. 1 includes a first storage block 1, a second storage block 2, a pointer block 3 for generating information of positions of storage elements to be accessed in the first and second storage blocks 1 and 2 for generating information of a position of a storage element to be accessed in a third storage block 6, a multiplier block 4 for multiplying information read out from the first and second storage blocks 1 and 2, an adder block 5 for adding an output of the multiplier block 4 to contents of a storage element of the third storage block 6 specified by the pointer block 3, the third storage block 6 for storing an output of the adder block 5 therein, and a controlling signal generating block 7 for generating timing control signals to control operation of the individual function blocks 1 to 6.

The first storage block 1 is provided to store individual elements of a square matrix A, for example, of 4 rows and 4 columns on the one to one correspondence basis therein. Such square matrix A is an orthogonal matrix and at the same time a symmetric matrix. In particular, the square matrix A is a square matrix for orthogonal transformation wherein individual coefficient data are determined in advance in accordance with a field to be applied.

The second storage block 2 is provided to store individual elements of a square matrix B, for example, of 4 rows and 4 columns. Such square matrix B consists of data arrayed in two dimensions to be orthogonally transformed.

The pointer block 3 is provided to generate information of positions of storage elements at which elements of the first and second square matrices A and B to be multiplied are stored and to generate information of a position of a storage element of the third storage block 6 at which a result of such multiplication is to be stored.

The multiplier block 4 is provided to execute a multiplication between selected elements of the first square matrix (hereinafter referred to as coefficient matrix) A and the second square matrix (hereinafter referred to as data matrix) B and to deliver a result of such multiplication to the adder block 5.

The adder block 5 adds the result of such multiplication by the multiplier block 4 to data from the storage element of the third storage block 6 selected by the pointer block 3 and to store a result of such addition to the original or selected storage element of the third storage block $\phi$. The third storage block 6 is provided to store a result of the multiplication between the coefficient matrix A and the data matrix B on a one to one correspondence basis for the individual rows and columns of storage elements thereof. Contents of the third storage block 6 are transferred in parallel to the second storage block 2 after completion of the matrix multiplication for the first time.

The controlling signal generating circuit 7 includes a hexadecimal counter 71 for counting a clock signal CLK and for developing a pulse signal each time the count value thereof reaches one of "4", "8", "12" and "16", a three-input OR gate 72 for receiving "4", "8" and "12" count outputs of the hexadecimal counter 71, an invertor 73 for inverting an output of the OR gate 72, an AND gate 74 for receiving the clock signal CLK and an output of the invertor 73, and another AND gate 75 for receiving the output of the OR gate 72 and the clock signal CLK.

The output of the AND gate 74 provides a timing signal for shifting operation (shifting of matrix elements stored therein) in the first storage block 1. Meanwhile, the output of the AND gate 75 provides a timing signal for shifting operation of matrix elements stored in the second storage block 2. The clock signal CLK provides a timing for shifting operation of the pointer block 3 and also provides a timing signal for reading and writing operation of data for the third storage block 6. The "16" count output $\phi$ of the hexadecimal counter 71 provides a timing for transfer of data from the third storage block 6 to the second storage block 2. The "16" count output of the counter 71 may be delivered also to the OR gate 72, if necessary, as shown by the dotted line 80 in FIG. 1.

The hexadecimal counter 71 is reset in response to a reset signal RESET. Such reset signal RESET is also used by a decoder 10 to form a selecting signal SELECT for selecting updating of data or circulating operation in the first storage block 1 and the second storage block 2. Further, the reset signal RESET is used also as a signal for resetting stored contents of the pointer block 3 and the third storage block 6.

In order to select a shifting direction of matrix elements in the first storage block 1 and the second storage block 2, a flip-flop 8, multiplexers 9a and 9b and decoder 10 are provided. The flip-flop 8 is reversed in latching state in response to a "16" count output of hexadecimal counter 71 and is reset in response to a reset signal RESET.

The multiplexer 9a delivers, in response to an output of the flip-flop 8, an output of the AND gate 74 either as a row direction shifting signal or as a column direction circulating shifting signal for the first storage block 1. Changing over of the output of the multiplexer 9a takes place in response to an output of the flip-flop 8.

The other multiplexer 9b delivers an output of the AND gate 75 either as a row direction shifting signal or as a column direction shifting signal for the second storage block 2. Changing over between the shifting signals of the multiplexer 9b is effected in response to an output of the flip-flop 8.

The decoder 10 decodes a "16" count output of the hexadecimal counter 71 and the reset signal RESET to enable either a column direction circulating operation or a row direction circulating operation in each of the first storage block 1 and the second storage block 2. In the following, detailed construction of the individual blocks will be described in an order.

Figure 2:
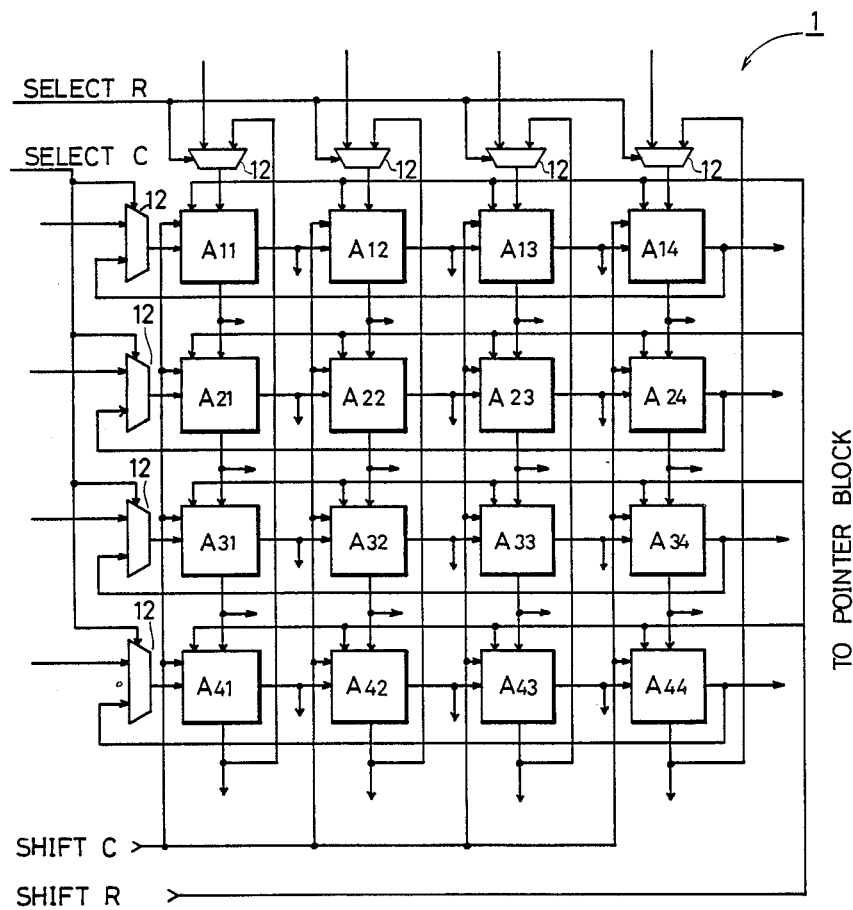
FIG. 2 is a block diagram schematically showing an exemplary construction of a storage block employed in the orthogonal transformation device of FIG. 1 for storing a coefficient matrix therein.

At first, construction of the first storage block will be described with reference to FIG. 2. The first storage block 1 includes registers A11 to A44 arranged in a square matrix of 4 rows and 4 columns. Each register Aij (i=1 to 4, j=1 to 4) is capable of making a shifting operation in the column direction and also in the row direction. A multiplexer 12 is provided on the input side of each of the first registers A11 to A41 in the first column for selectively passing either write data or internal circulating data in response to a selecting signal SELECT C. Similarly, a multiplexer 12 is provided for each of the first registers A11 to A14 in the first row of the register matrix for selectively passing either external write data or internal circulating data in response to a selecting signal SELECT R.

Shifting operation of the register matrix in the row direction is effected in response to a shifting signal SHIFT R delivered from the multiplexer 9a. A shifting timing in the column direction is provided by a shifting signal SHIFT C from the multiplexer 9a.

The multiplexers 12 pass external data therethrough when the selecting signal SELECT C or SELECT R is in an active state, but when the selecting signal SELECT C or SELECT R is in a non-activate state, the multiplexers 12 selectively pass therethrough circulating data which are circulated in the matrix.

Output of each register Aij is transmitted to the pointer block 3. Since a shifting signal SHIFT C (R) to be provided to the first storage block 1 is provided by ANDing an output of the invertor 73 and a clock signal CLK, contents of the individual registers are shifted by one bit in the row or column direction for each rising edge of the clock signal CLK except the fourth clock at which such shifting operation is inhibited.

Figure 3:
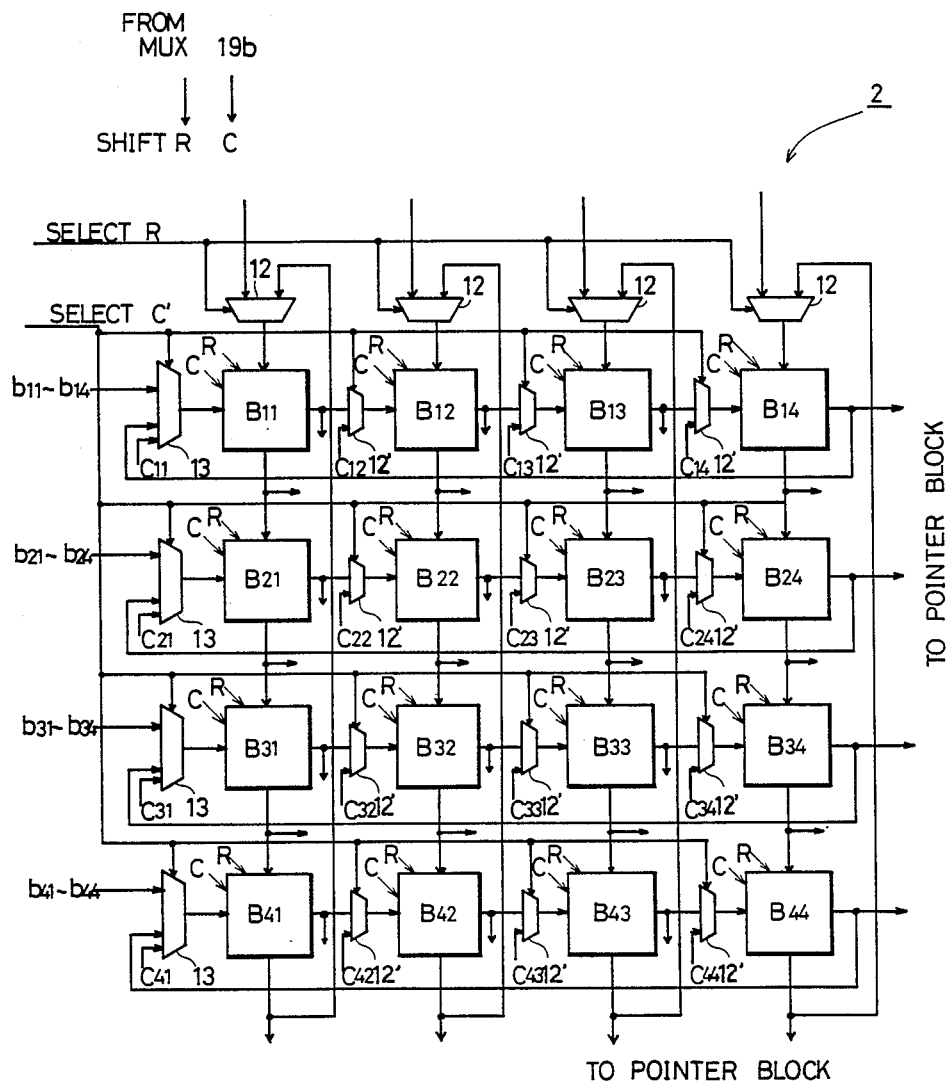
FIG. 3 is a block diagram schematically showing a construction of a block employed in the orthogonal transformation device of FIG. 1 for storing a data matrix therein.

Referring now to FIG. 3, there is shown construction of the second storage block 2. The second storage block 2 includes registers B11 to B44 arranged in a square matrix of 4 rows and 4 columns. Each register Bij is capable of making a shifting operation in the column direction and also in the row direction.

A three-input multiplexer 13 is provided on the input side of each of the first registers B11 to B41 in the first column for selectively passing external data, internal circulating data circulated in the same row or data-Cij from the third storage block 6. A two-input multiplexer 12 is provided on the input side of each of the first registers B11 and B14 in the first row for selectively passing either external data or circulating data from the same column. Similarly, a two-input multiplexer 12' is provided on the input side of each of the registers in the second to fourth columns for selectively passing either an output of the register at the preceding stage or data Cij from the third storage block 6. Shifting timings for the individual registers B11 to B44 are provided by a shifting signal SHIFT R or SHIFT C' delivered from the multiplexer 9b. The shifting signal SHIFT R provides a shifting operation in the row direction while the shifting signal SHIFT C, provides a shifting operation in the column direction.

Output of each register Bij is transmitted to the pointer block 3.

Changing over operation of the multiplexers 12' an 13 provided for the individual rows is provided by a selecting signal SELECT C' Changing over operation of multiplexers 12 provided on the input sides of the individual columns is provided by a selecting signal SELECT R.

A shifting signal SHIFT C (R) to be provided to the second storage block 2 is provided by ANDing an output of the OR gate 72 and a clock signal CLK. Accordingly, stored contents of the individual registers in the second storage block 2 are shifted by one bit in the row or column direction in synchronization with each rising edge of the clock signal CLK for each of the count values "4", "8" and "12" of such clock signal CLK.

Figure 4:
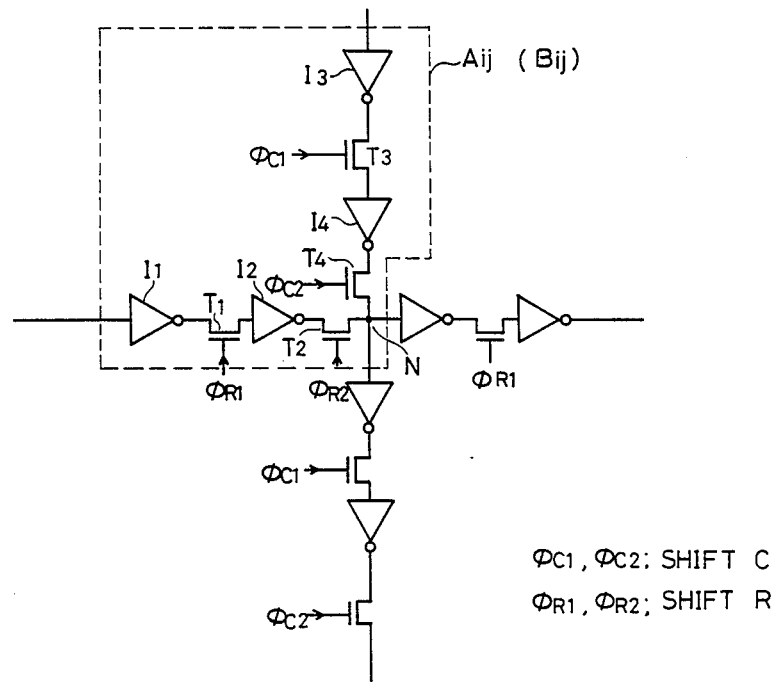
FIG. 4 is a circuit diagram showing an exemplary construction of a register for shifting operation in the directions of a row and a column shown in FIGS. 2 and 3.

The first and second storage blocks 1 and 2 have the same construction as described above. However, as for shifting signals for providing shifting operation of stored contents of them, when a shifting signal SHIFT R for providing a shifting operation in the row direction is delivered to the first storage block 1, a shifting signal SHIFT C for providing a shifting operation in the column direction is delivered to the second storage block 2. To the contrary, when a shifting signal SHIFT C is delivered to the first storage block 1, a shifting signal SHIFT R is delivered to the second storage block 2. Such changing over is effected by the multiplexers 9a and 9b (refer to FIG. 1). Construction of the shift registers Aij and Bij which constitute storage elements included in the first storage block 1 and the second storage block 2 are capable of making a shifting operation in the column direction and also in the row direction as shown in FIG. 4. As shown in FIG. 4, the shift registers Aij (Bij) which are capable of making a shifting operation in the column direction and in the row direction are constituted from shift registers arranged in the column direction and the row direction. A shifting operation in the row direction is performed by a shift register consisting of a pair of invertors 11 and 12 and a pair of transfer gate transistors T1 and T2. A shifting operation in the column direction is performed by another pair of invertors I3 and I4 and another pair of transfer gate transistors T3 and T4.

The transfer gate transistors T1 and T2 receive, at the gates thereof, shift clocks $\phi_{R1}$ and $\phi_{R2}$ for the row direction. The clocks $\phi_{R1}$ and $\phi_{R2}$ are 2-phase clock signals which do not overlap with each other. The clock signals $\phi_{R1}$ and $\phi_{R2}$ constitute a shifting signal SHIFT R.

Timings of operation in the column direction are provided by clock signals $\phi_{C1}$ and $\phi_{C2}$ delivered to the gates of the transfer gate transistors T3 and T4. The clock signals $\phi_{C1}$ and $\phi_{C2}$ are 2-phase nonoverlapping clock signals and constitute a shifting signal SHIFT C. A node N forms an output terminal.

Figure 5:
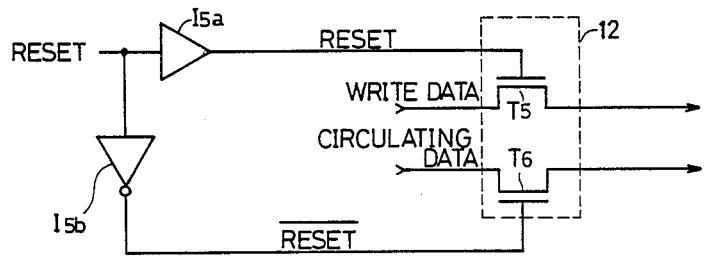
FIG. 5 is a circuit diagram showing an exemplary construction of a two-input multiplexer.

FIG. 5 shows a exemplary construction of the two-input multiplexers 12. In the construction of the two-input multiplexer shown in FIG. 5, a selecting signal SELECT is formed by a buffer I5a and an invertor buffer I5b. The buffer I5a and the invertor buffer I5b receives a reset signal RESET and outputs such reset signal RESET and an inverted signal $\overline{\text{RESET}}$ therefrom, respectively. The multiplexer 12 shown is constituted from a transfer gate transistor T5 for passing therethrough write data received from the outside of the device in response to a reset signal RESET, and another transfer gate transistor T6 for passing therethrough data circulated from the same column or the same row in response to an inverted reset signal $\overline{\text{RESET}}$.

In the construction shown in FIG. 5, selecting signals SELECT C and SELECT R are delivered at a time to the first and second storage blocks 1 and 2. Even with such construction, however, circulating data in the column direction and in the row direction will not collide with each other because each of the first storage block 1 and the second storage block 2 makes a shifting operation only in one of the column direction and the row direction.

Figure 6:
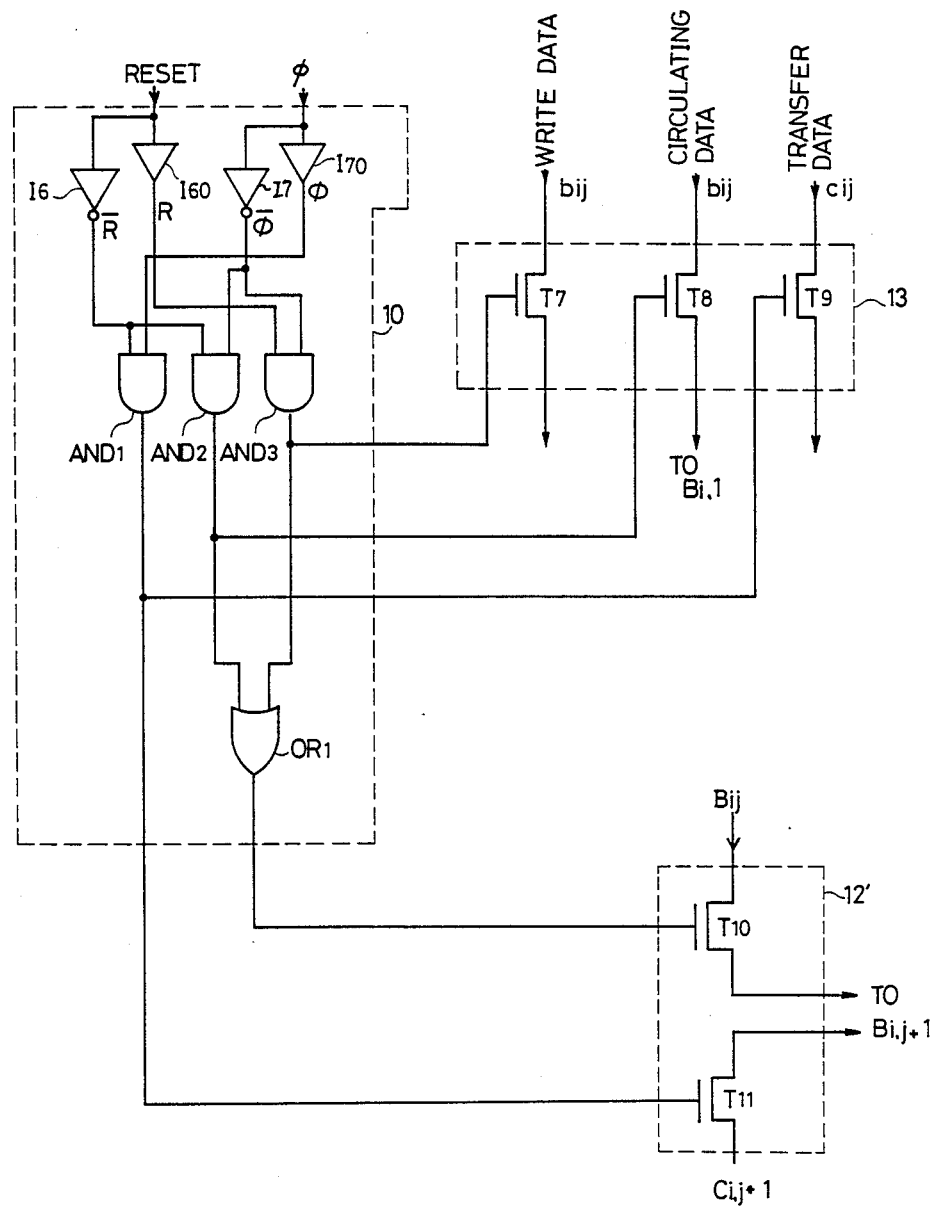
FIG. 6 is a circuit diagram showing an exemplary construction of a three-input multiplexer and a selecting signal generating decoder section included in the storage block shown in FIG. 3 and also showing an exemplary particular construction of a two-input multiplexer and an exemplary construction of a decoder section for generating a selecting signal both shown in FIG. 3.

FIG. 6 shows an exemplary construction of the three-input multiplexers 13 included in the second storage block 2. Referring to FIG. 6, a selecting signal SELECT C' includes three kinds of signals such selecting signal SELECT C' for the multiplexer 13 is produced from a pair of invertor buffers I6 and I7, a pair of buffers I60 and I70 and three AND gates AND1, AND2 and AND3. The buffer I60 and the invertor buffer I6 both receive a reset signal RESET and produces a pair of complementary signals R and $\overline{\text{R}}$, respectively. The other buffer I70 and the invertor buffer I7 receive a transfer instruction signal ("15" count output of the hexadecimal counter 71) and outputs a pair of complementary signals $\phi$ and $\overline{\phi}$, respectively. The AND gate AND1 receives a transfer signal $\phi$ and an inverted signal $\overline{\text{R}}$ of a reset signal. The AND gate AND2 receives an inverted reset signal $\overline{\text{R}}$ and an inverted transfer signal $\overline{\phi}$. The AND gate AND3 receives a reset signal R and an inverted transfer signal $\overline{\phi}$.

Each of the three-input multiplexers 13 includes a transfer gate transistor T7 for passing externally applied write data therethrough in response to an output of the AND gate AND3, another transfer gate transistor T8 for selectively passing circulating data from the same row in response to an output of the AND gate AND2, and a further transfer gate transistor T9 for selectively passing a result of a multiplication transferred from the third storage block 6 in response to a signal from the AND gate AND1. Accordingly, the multiplexer 13, in its reset state, transfers externally applied write data sequentially to the register through the transfer gate transistor T7. Upon shifting operation, circulating shifting operation of data is effected by way of the transfer gate transistor T8. Upon transfer of data from the third storage block 6, writing of data is effected by way of the transfer gate transistor 9.

FIG. 6 also shows the two-input multiplexer 12' provided for each row of the second storage block 2. The multiplexer 12' is controlled in operation in accordance with an output of the decoder 10. Referring to FIG. 6, a portion of the decoder 10 for controlling the two-input multiplexer 12' also includes an OR gate OR1 for receiving outputs of AND gates AND2 and AND3. The two-input multiplexer 12' includes a transfer gate transistor T10 for receiving at the gate thereof an output of the OR gate OR1 to selectively transmit an output of the register Bij at the preceding stage to the register Bi (j+1) at the subsequent next stage, and another transfer gate transistor T11 for selectively passing data Ci (j+1) of a result of a multiplication from the third storage block 6 to the register Bi (j+1) in response to the output of AND gate AND1.

The reset signal R is at a low ("L") level when a transfer signal $\phi$ is produced. Accordingly, when data is to be transferred between registers, the transfer gate transistors T10 is turned on, but to the contrary when the transfer signal $\phi$ rises, the transfer gate transistor T11 is turned on.

In the construction described above, a selecting signal SELECT C' is constituted from a total of 5 kinds of signals, three for the multiplexer 13 and two for the multiplexer 12'. Such production of a controlling signal (selecting signal) from the decoder 10 as described above is a mere example, and production of a controlling signal can be naturally realized with any other circuit construction.

Figure 7:
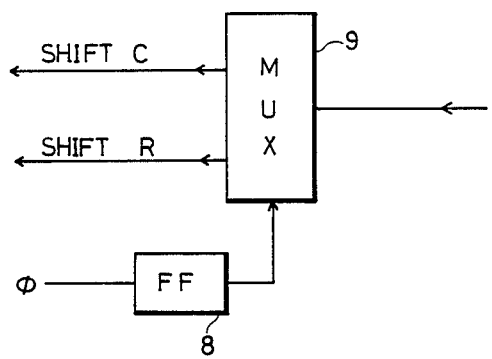
FIG. 7 is a block diagram schematically showing a construction for changing over a shifting signal shown in FIGS. 2 and 3.

As for shifting directions of stored data in the first storage block 1 and the second storage block 2, when a shifting operation is effected in the column direction in one of the storage blocks 1 and 2, a shifting operation is effected in the row direction in the other of the storage block 1 and 2. This may be attained by such a construction that, for example, an output of such a multiplexer 9 as shown in FIG. 7 is changed over in response to an output of the flip-flop 8 and a changing over operation of the multiplexer 9a for the first storage block 1 is made reverse to that of the multiplexer 9b for the second storage block 2. This can be realized if an output of the flip-flop 8 is provided in a mutually complementary relationship to the multiplexers 9a and 9b.

Figure 8:
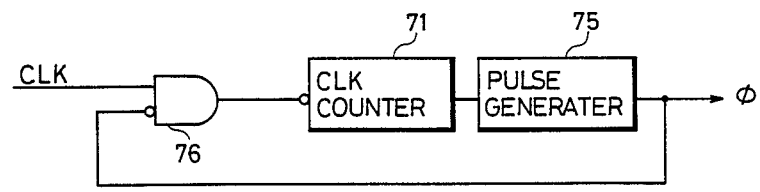
FIG. 8 is a block diagram of transferring signal generating circuit showing another embodiment of the present invention.

It is to be noted that, in the construction described above, transfer of data from the third storage block 6 to the second storage block 2 is described to be performed in a single clock pulse. However, in order to make transfer of data, the transfer signal $\phi$ may be produced from a pulse generator which produces a pulse having a predetermined time duration in response to a count output of the counter 71. In particular, as shown in FIG. 8, a pulse generator (such as, for example, a one-shot multivibrator) 75 may be provided which produces a pulse having a predetermined time duration in response to each output of the 16-th count of the counter 71. In this instance, a transfer signal $\phi$ should be provided to an inverting input of an AND gate 76 while a clock signal CLK is provided to a true input of the AND gate 76, and an output of the AND gate 76 should be provided to a clock input of the counter 71. With the construction, when a transfer signal φ is produced, a clock CLK is not provided to the counter 71, and consequently, transfer of data can be performed more surely.

Figure 9:
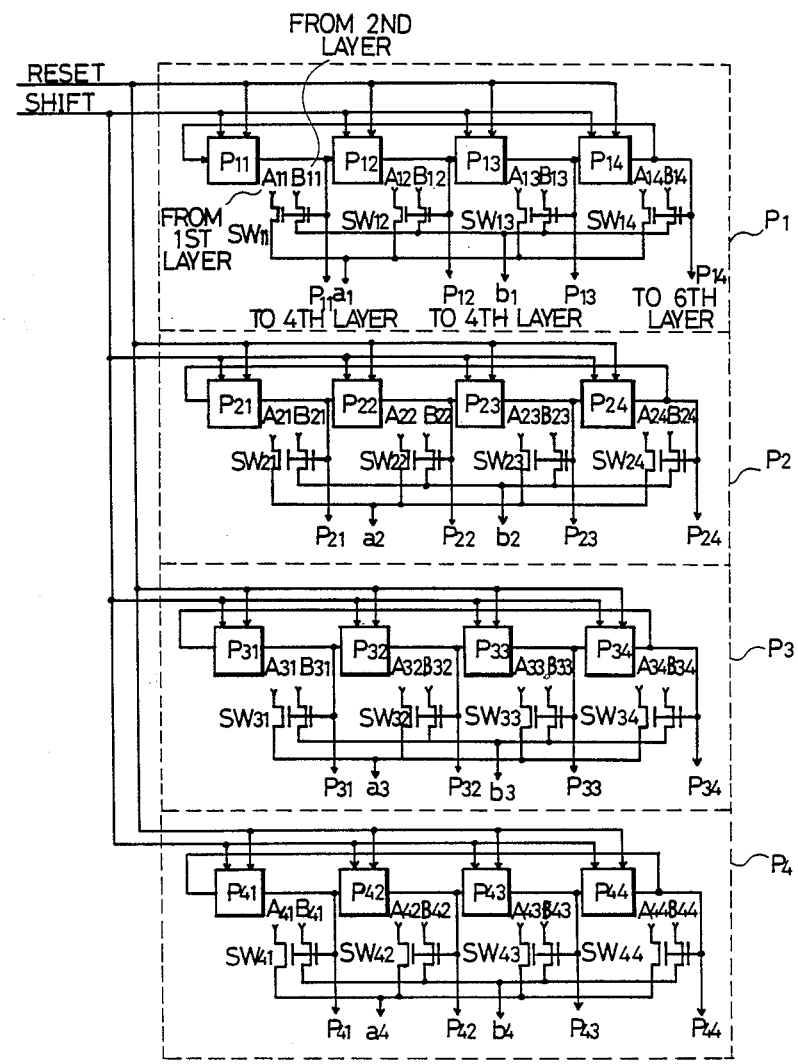
FIG. 9 is a schematic circuit diagram showing a construction of a pointer block employed in the orthogonal transformation of FIG. 1 for generating position information.

FIG. 9 shows detailed specific construction of the pointer block 3. Referring to FIG. 9, the pointer block 3 includes four sub-blocks P1 to P4 provided for the individual rows. The sub-blocks P1 to P4 have a same construction. The pointer sub-block P1 for the first rows includes 4-bit shift registers P11 to P14 which are capable of making a circulating shifting movement in the row direction. A register P1j of the sub-block P1 selects an output of one register A1j of the registers A11 to A14 in the first row of the first storage block 1 to be selectively delivered to the multiplier block 4 and selects an output of one B1i of the registers B11 to B14 in the first row of the second storage block 2 to be transmitted to the multiplier block 4. The register P1i of the sub-block P1 further determines which one of outputs of the registers included in the third storage block 6 should be selectively transmitted to the adder block 5.

In the sub-block P1 for the first row, an output of each of the pointer registers P1j is coupled to the gate of a corresponding one switching transistor SW1j of switching transistors SW11 to SW14, and accordingly, a selected switching transistor SW1j receives an output of the register A1j of the first storage block 1 and an output of the register B1j of the second storage block 2. The register A1j of the first storage block 1 and the register B1j (j=1 to 4) in the first row of the second storage block 2 are thus selected in pair and data therein are transmitted as data a1 and b1, respectively, to the multiplier block 4 in which a multiplication of the data a1 and b1 should be effected. With the construction described above, outputs of the registers located in the same columns and in the same rows of individual storage blocks 1 and 2 are transmitted to the multiplier block 4. The individual pointer registers are reset in response to a reset signal RESET, and stored contents therein are shifted by one bit in the row direction in response to a shifting signal SHIFT. Such shifting signal SHIFT delivered to the pointer sub-block P1 is a clock signal from the controlling signal generating circuit 7, and accordingly, stored contents of the pointer registers A1j are shifted by one bit in the row direction in response to each rising edge of a clock signal CLK. The other sub-blocks P2 to P4 have the same construction as the sub-block P1. In particular, from the sub-block P2, registers A2j and B2j (i=1 to 4) in the second rows of the first and second storage blocks 1 and 2 are selected in pair and stored contents thereof are transmitted to the multiplier block 4 by way of switching transistors SW21 and SW24. In the third sub-block P3, registers A3j and B3j in the third rows of the first and second storage blocks 1 and 2 are selected in pair and stored contents thereof are delivered to the multiplier block 4 by way of switching transistors SW31 to SW34. The fourth sub-block P4 selects registers A4j and B4j in the fourth rows of the first and second storage blocks 1 and 2 and delivers outputs of them to the multiplier block 4. Such pointer outputs of the sub-blocks P2 to P4 are delivered also to the third storage block 6 similarly to those of the first sub-block P1. Timings at which a reset signal and a shifting signal are provided in the individual sub-blocks are similar to those in the first sub-block P1, and a similar shifting operation and a similar resetting operation are effected.

With the construction of the pointer block 3 described above, although contents of each pointer register Pij is shifted by one bit in the row direction in response to a shifting signal SHIFT, each pointer register Pij is set in the following manner in response to a reset signal RESET.

$$Pij = 1, i = j$$
$$= 0, i \neq j$$

In particular, upon resetting of the pointer block 3, only the registers Pii corresponding to the diagonal elements in the register construction of 4 rows and 4 columns are set to "1".

Figure 10:
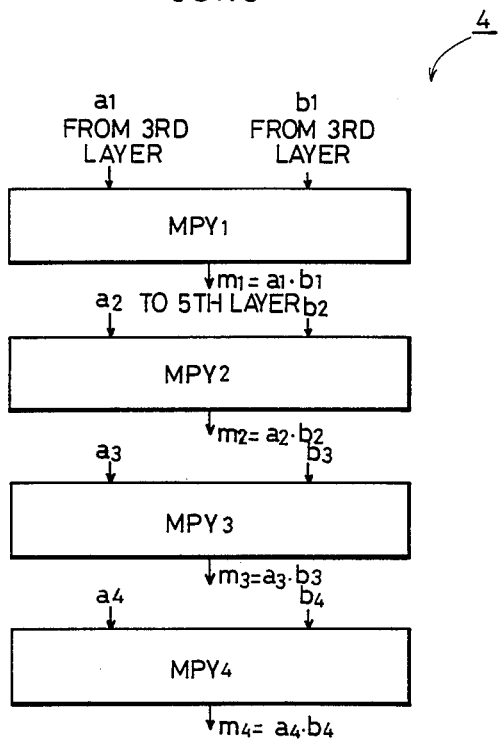
FIG. 10 is a block diagram showing a construction of a multiplier block of the orthogonal transformation device of FIG. 1.

Referring now to FIG. 10, the multiplier block 4 includes four multipliers MPY1 to MPY4 provided for the individual rows. The multiplier MPY1 executes a multiplication between data a1 and b1 of the first rows selected by the pointer block 3 (sub-block P1). Results m1 of the multiplication are delivered to the adder block 5. Similarly, the multiplier MPY2 receives data a2 and b2 of the second rows selected by the pointer block 3 (more precisely, the sub-block P2), executes a multiplication between them and delivers a result of m2 of such multiplication to the adder block 5. Similarly, the multiplier MPY3 calculates a product between matrix elements a3 and b3 of the third rows selected by the pointer block 3 (sub-block P3) and delivers a result m3 of such multiplication to the adder block 5 while the multiplier MPY4 executes a multiplication between outputs of matrix elements a4 and b4 selected by the pointer sub-block P4 and transmits a result m4 of such multiplication to the adder block 5.

Figure 11:
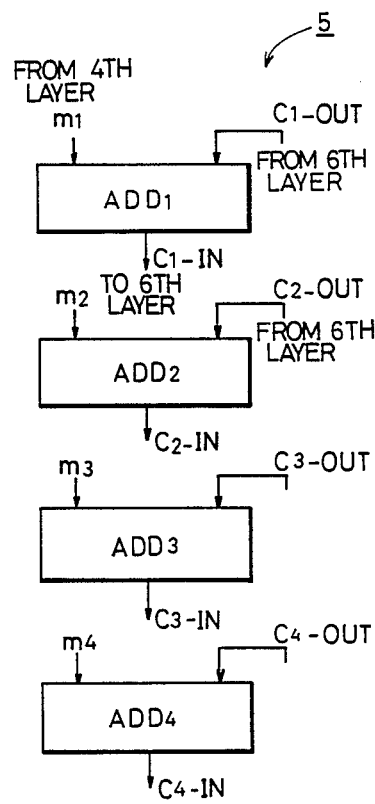
FIG. 11 is a similar view but showing a construction of an adder construction employed in the orthogonal transformation device of FIG. 1.

Referring now to FIG. 11, the adder block 5 includes four adders ADD1 to ADD4 provided for the individual rows. The adder ADD1 executes an addition between an output m1 of the multiplier MPY1 and an output C1-out of a register of the first row of the third storage block 6 selected by the pointer block 3 (sub-block P1) and stores a result C1-in of such addition to the original or selected storage element or register of the third storage block 6. The adder ADD2 adds an output m2 of the multiplier MPY2 to an output C2-out of a matrix element of the second row of the third storage block 6 selected by the pointer block 3 (sub-block P2) and stores a result C2-in of such addition again into the original or selected storage element. The adder ADD3 adds an output m3 of the multiplier MPY3 to an output C3-out of a matrix element of the third row of the third storage block 6 selected by the pointer block 3 (sub-block P3) and stores a result C3-in of such addition again into the original storage element. The adder ADD4 adds an output m4 of the multiplier MPY4 to an output C4-out of a matrix element of the fourth row of the third storage block 6 selected by the pointer block 3 (sub-block P4) and stores a result C4-in of such addition again into the original storage element.

Figure 12:
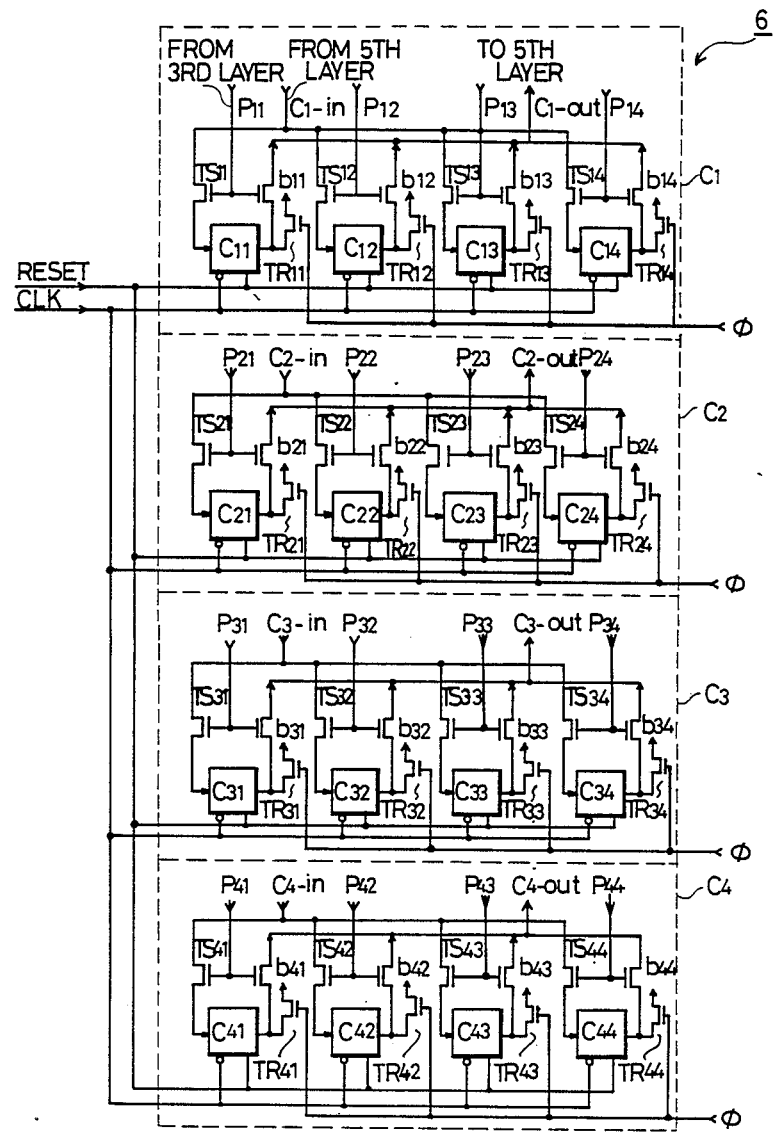
FIG. 12 is a schematic circuit diagram showing a detailed construction of a storage block of the orthogonal transformation device of FIG. 1 for storing results of multiplication therein.

Referring now to FIG. 12, construction of the third storage block 6 will be described. The third storage block 6 is constituted from four blocks C1 to C4 provided for the individual rows. The individual blocks C1 to C4 have a same construction and each includes four registers Cij. Each register Cij is connected at each of an input and an output thereof to a transistor switch TSij which is turned on in response to an output of a corresponding pointer register Pij of the pointer block 3 to couple an input of a corresponding register Cij to an output of a corresponding adder of the adder block 5 and to couple output of the register Cij to an input of the corresponding adder of the adder block 5.

Each register Cij outputs contents thereof in response to a rising edge of a clock signal CLK and writes given data therein in response to a falling edge of a clock signal CLK. Meanwhile, each register Cij is reset in response to transition of a reset signal RESET to a high ("H") level so that contents thereof are cleared. With the construction, the individual blocks C1 to C4 transfer data to and from the corresponding adders ADD1 to ADD4.

Further, the outputs of the registers Cij included in the individual blocks C1 to C4 are connected to respective transistor switches TR11 and TR44 which are turned on in response to a transfer signal φ to transfer contents of the registers Cij to registers Bij included in the second storage block 2. Then, after completion of a first multiplication of matrices, a result of such matrix multiplication stored in the third storage block 3 are all transferred in parallel to the second storage block 2.

Upon multiplication of matrices for the second time, the shifting directions of the shift registers in the first storage block 1 and the second storage block 2 are changed over with each other. In particular, in the case that the first storage block 1 makes a shifting operation in the column direction in the first multiplication, the second storage block makes a shifting operation in the row direction, and then in the second multiplication of the matrix, the first storage block 1 makes a shifting operation in the row direction while the second storage block 2 makes a shifting operation in the column direction.

Figure 13:
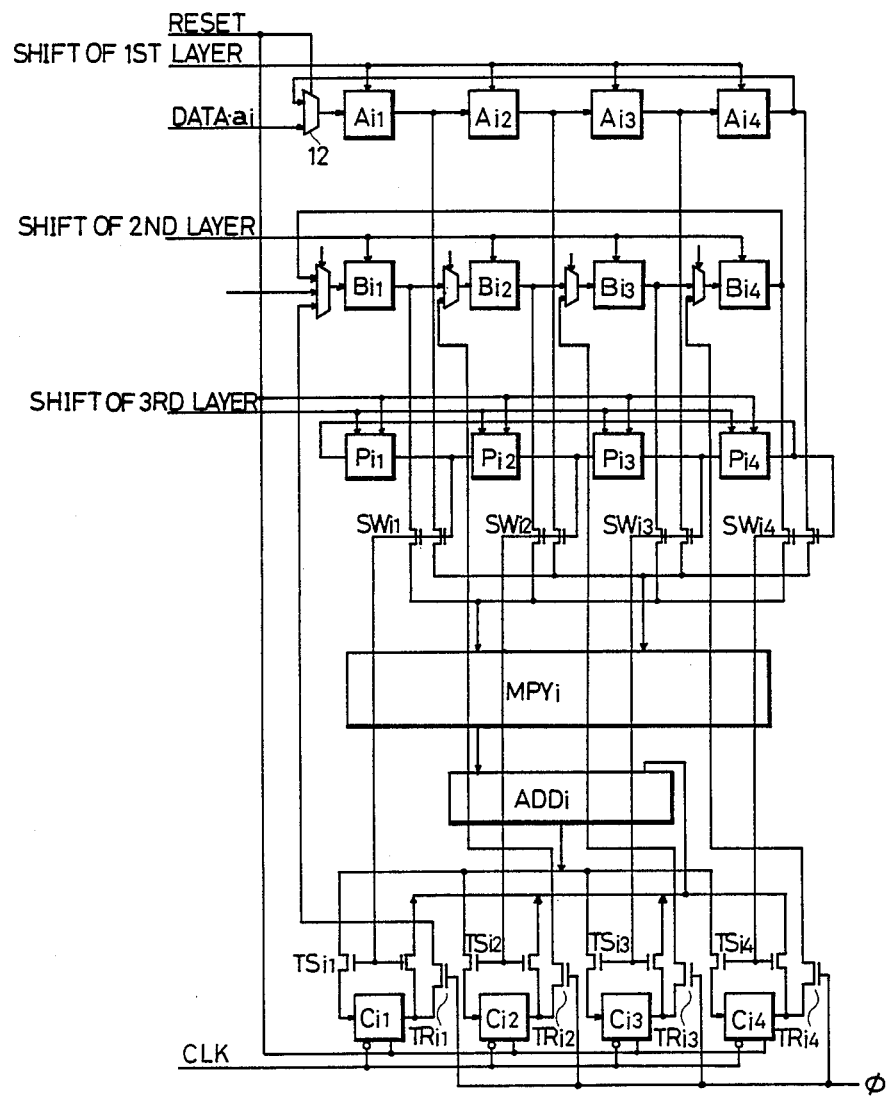
FIG. 13 is a schematic circuit diagram showing a construction of the orthogonal transformation device of FIG. 1 for a certain row.

FIG. 13 shows an exemplary connecting construction for a certain row of the individual blocks shown FIGS. 2 to 12. As seen from FIG. 13, in the first and second storage blocks 1 and 2, the registers which form storage elements are arranged in a matrix, and the pointer registers of the pointer block 3 and the storage registers Cij of the third storage block 6 are arrayed similarly in matrices. Accordingly, couplings of the individual elements of each block have a very high directivity.

Accordingly, where the individual blocks which constitute the orthogonal transformation device are layered in a vertical direction on a same semiconductor substrate, for example, by the SOI (silicon on insulator) technique, the corresponding relationship among the individual elements in the vertical direction can be determined readily, and wires for connecting the individual circuit blocks can be minimized in length. Besides, such multi-layering structure can realize an orthogonal transformation device which is high in density and compact.

Figure 14:
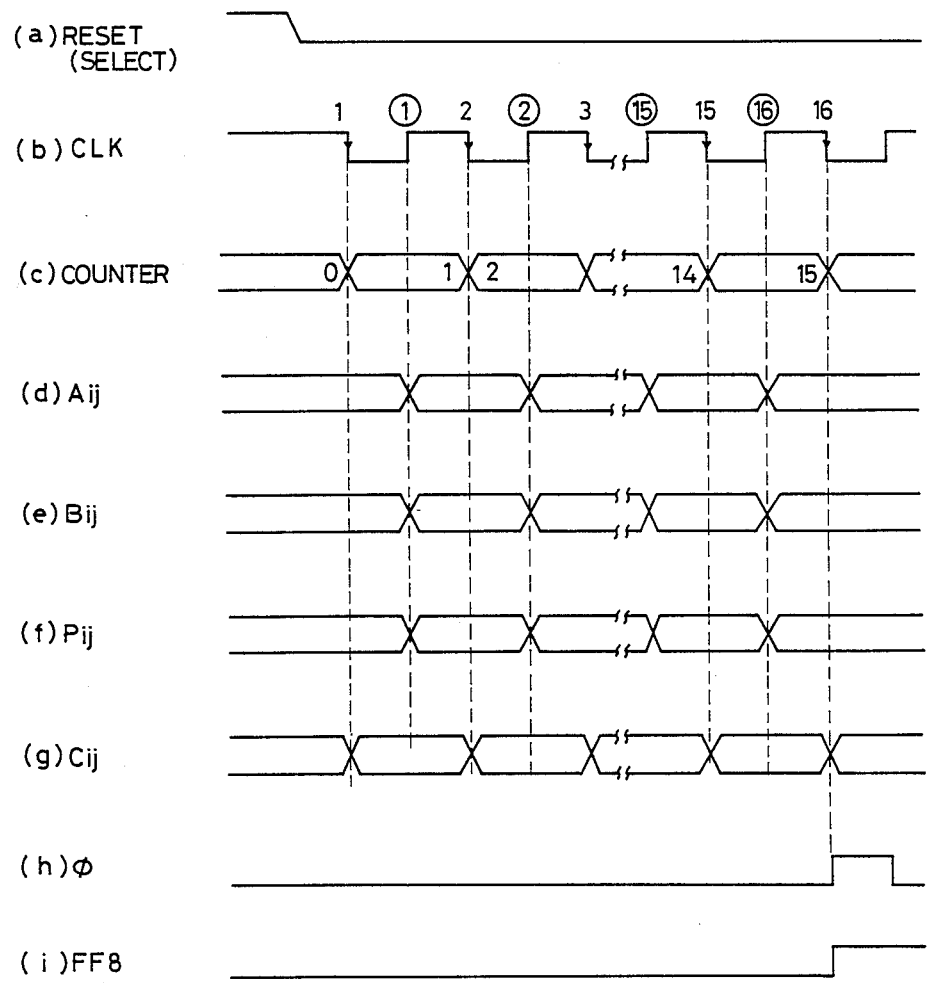
FIG. 14 is a waveform chart illustrating operation of the orthogonal transformation device of FIG. 1.
Figure 15B:
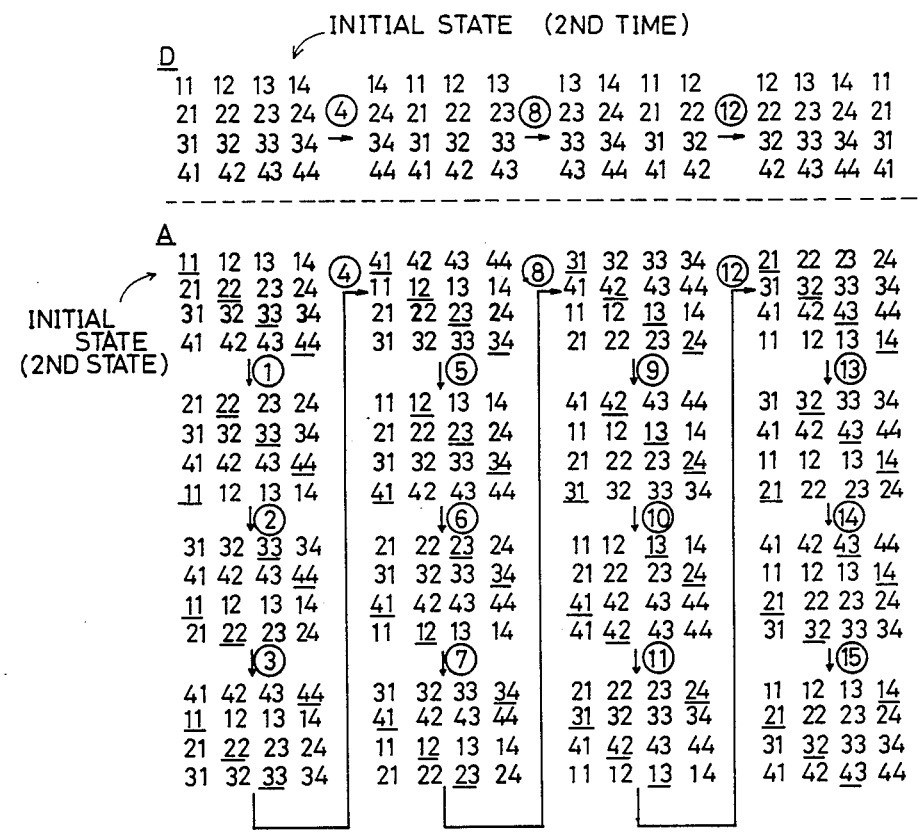

Subsequently, operation of the orthogonal transformation device for two-dimensional discrete data according to the embodiment of the present invention will be described with reference mainly to FIG. 14. Reference is also made to FIGS. 14, 15 and 15B wherein FIG. 14 is a waveform diagram showing operation of the orthogonal transformation device and FIGS. 15A and 15B illustrate shifting operations of the registers Aij and Bij in the first storage block and the second storage block, respectively.

(1) Initialization

At first, the reset signal RESET is caused to rise to the "H" level. Consequently, the multiplexers 12, 13 and 12' are put into a condition wherein they can pass therethrough data which are provided newly from the outside of the device. In this instance, in which directions data are to be individually written into the first and second storage blocks 1 and 2 is determined suitably in accordance with connecting relationships thereof to an external data writing device which is connected to the orthogonal transformation device. Subsequently, values of data a1 to a4 and b1 to b4 are set corresponding to matrices A and B to be calculated, that is, the coefficient matrix A and the data matrix B, and then values of elements of the matrices A and B are set to individual corresponding registers Aij and Bij of the first storage block 1 and the second storage block 2, respectively, in response to a clock signal CLK. While no shifting clock for data writing is provided in the construction shown in FIG. 1, a multiplexer for example is used to provide a clock signal CLK in place of a shifting clock SHIFT R (C) to effect writing of initial data (data and coefficients for calculation). Such initialization is shown in the state of initial values in FIG. 15A. In FIG. 15A, a portion above a broken line illustrates shifting operations for transfer of contents of the registers of the second storage block while the other portion below the broken line illustrates shifting operations of contents of the registers of the first storage block. In this instance, such a construction may be employed wherein the coefficient matrix A is held constant and only a data array B is newly written in.

Figure 16A:
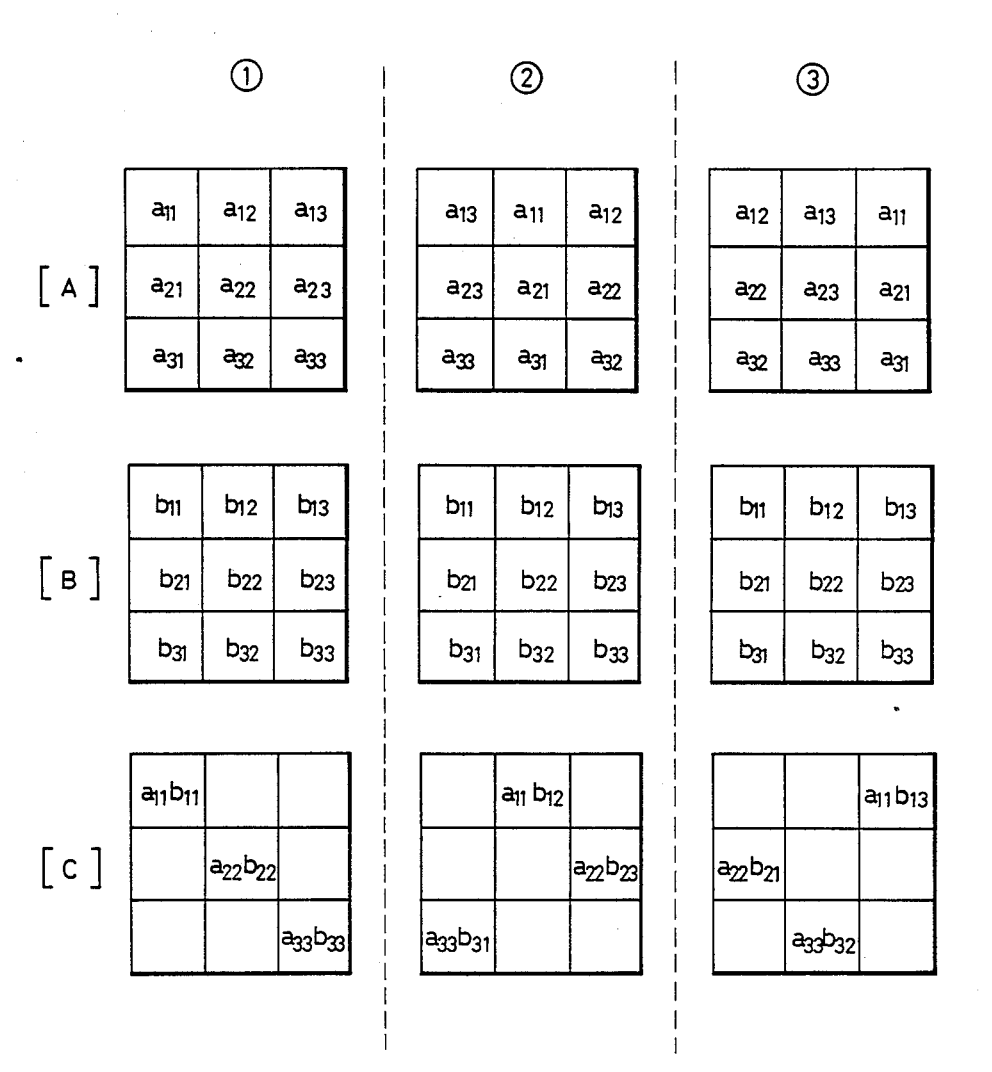

Now, the reset signal RESET is at the "H" level and all of the registers Cij of the third storage block 6 and the hexadecimal counter 71 are in a cleared state so that the stored contents and the count value of them are all "0", respectively. At the same time, the pointer registers Pij included in the pointer block 3 are reset such that only the diagonal elements, that is, only Pii, output the "H" level. Accordingly, in the initialized state, such values as indicated as initial values in FIG. 16A are set in the individual registers Aij and Bij. Further, since the pointer registers Pij are in such a reset state by the reset signal RESET, outputs of underlined values in FIG. 15A are selected. Here in FIG. 15A, the position of the i-th row and the j-th column in the construction of the 4 rows and the 4 columns represents a register Aij or Bij, and a numeral (kl) indicated at each position represents an input element at the k-th row and the l-th column of the matrix A or B.

(2) Multiplication

The reset signal RESET is changed to the "L" level and the clock signal CLK is made effective. Consequently, a multiplication between the matrices is executed in response to such clock signal CLK. While it is described above that, upon preceding writing of initial data, data are written in response to a clock signal CLK, clocks required for such writing may be a clock signal different from the clock signal CLK which specifies a shifting operation.

① At first, the reset signal RESET is changed to the "L" level. Consequently, the multiplexers 12 and 13 inhibit transmission of external data and cause internal data to circulate therein. Meanwhile, the multiplexer 12' causes data delivered from the shift registers at the preceding stage to pass therethrough similarly as upon resetting. Further, the switching transistors SWii the pointer block 3 which receive outputs of the pointer registers Pii on the diagonal line are all turned on so that the diagonal elements Aii from the first storage block 1 and the diagonal elements Bii of the second storage block 2 are delivered to the multiplier block 4. The multiplier MPY1 to MPY4 thus execute multiplications of the matrix elements provided thereto and deliver results of such multiplications to the individual adders ADD1 to ADD4 of the adder block 5, respectively. Since the diagonal registers Cii among the registers included in the third storage block 6 are selected in accordance with outputs of the registers of the pointer block 3, outputs of the address ADD1 to ADD4 included in the adder block 5 are given as follows.

$$ADD1 = a11 \times b11 + c11$$

$$ADD2 = a22 \times b22 + c22$$

$$ADD3 = a33 \times b33 + c33$$

$$ADD4 = a44 \times b44 + c44$$

Then, when the clock signal CLK falls to the "L" level, corresponding values are written into and latched in the registers Cii of the third storage block 6. The count value of the hexadecimal counter 71 is incremented by one to "1" in response to such falling edge of the clock signal CLK.

② It is assumed that a shifting signal SHIFT R in the row direction is delivered to the first storage block 1 while a shifting signal SHIFT C' in the column direction is delivered to the second storage block 2.

When the clock signal CLK rises again, contents of the registers Aij of the first storage block 1 are shifted by one bit in the row direction in response to such rising edge of the clock signal CLK. At the same time, outputs of the pointer registers Pij included in the pointer block 3 are shifted by one bit in the row direction. As a result, stored contents of the registers Aij of the first storage block 1 are those values at the positions in the second row in the first column shown in FIG. 15A. On the other hand, stored contents of the second storage block 2 for the matrix B are not changed because a shifting signal for the second storage block 2 is produced each time the count value of the hexadecimal counter 71 presents a multiple of "4". Accordingly, outputs of the adders ADD1 to ADD4 are given as follows:

$$ADD1 = a11 \times b12 + c12$$

$$ADD2 = a22 \times b23 + c23$$

$$ADD3 = a33 \times b34 + c34$$

$$ADD4 = a44 \times b41 + c41$$

Then, when the clock signal CLK changes to the "L" level, a result of such addition is latched into the registers C12, C23, C34 and C41 of the third storage block 6 which are selected by the pointer registers. Meanwhile, the count value of the hexadecimal counter 71 is incremented by one to "2".

③ Subsequently, when the clock signal CLK changes to the "H" level, contents of the registers Aij of the first storage block 1 are shifted by one bit in the row direction while contents of the pointer registers Pij are shifted by one bit in the row direction. In this instance, contents of the registers Bij of the second storage block 2 are not yet shifted and remain in the initial state. As a result, the registers Aij, Bij and Cij selected by the pointer registers Pij are now registers adjacent in the row direction to the registers selected at step ② above. Accordingly, outputs of the adders ADDi are given as follows:

$$ADD1 = a11 \times b13 + c13$$

$$ADD2 = a22 \times b24 + c24$$

$$ADD3 = a33 \times b31 + c31$$

$$ADD4 = a44 \times b42 + c42$$

Then, when the clock signal CLK changes to the "L" level, such outputs of the adders ADDi are latched into the registers C13, C24, C31 and C42 which are selected by the pointer registers Pij from the registers of the third storage block 6. The count value of the hexadecimal counter 71 is incremented to "3" in response to such falling edge of the clock signal CLK to the "L" level.

④ When the clock signal CLK subsequently changes to the "H" level, contents of the registers Aij of the first storage block 1 are changed to those indicated below ③ of FIG. 15A similarly as at the steps described above. In particular, contents of the individual registers Aij are shifted by one bit in the row direction in response to such rising edge of the clock signal CLK. Similarly, outputs of the pointer registers Pij are also shifted by one bit in the row direction. In this instance, since the count value of the hexadecimal counter 71 is still "3", contents of the registers Bij of the second storage block 2 are not changed. Accordingly, outputs of the adders ADDi are given as follows:

$$ADD1 = a11 \times b14 + c14$$

$$ADD2 = a22 \times b21 + c21$$

$$ADD3 = a33 \times b32 + c32$$

$$ADD4 = a44 \times b43 + c43$$

Then, when the clock signal CLK changes to the "L" level, outputs of the adders ADDi are written into and latched in the registers C14, C21, C32 and C43 selected by the pointer registers. Further, the count value of the hexadecimal counter 71 is incremented by one to "4" in response to the falling edge of the clock signal CLK.

⑤ When the clock signal CLK then changes to the "H" level, a shifting signal is not delivered to the first storage block 1 due to an action of the invertor 73 and the AND gate 74, and consequently, stored contents of the first storage block 1 are not shifted. To the contrary, a shifting signal SHIFT for the second storage block 2 is produced as an output of the OR gate 72 in response to the rising edge of the clock signal CLK. Consequently, contents of the registers Bij of the second storage block 2 are shifted by one bit in the column direction. The shifting signal SHIFT which is delivered to the pointer block 3 is the clock signal CLK, and contents of the pointer block 3 are shifted by one bit in the row direction. As a result, contents of the registers Aij and Bij and the pointer registers Pij are changed to those values denoted on the right-hand side of ④ in FIG. 15A, and outputs of the adders ADD1 are given as follows:

ADD1=a12×b21+c11

ADD2=a23×b32+c22

ADD3=a34×b43+c33

ADD4=a41×b14+c44

Then, when the clock signal CLK subsequently changes to the "L" level, the outputs of the adders ADD1 are latched into the storage registers C11, C22, C33 and C44 selected by the pointer registers Pij. Simultaneously, the count value of the hexadecimal counter 71 is incremented to "5".

After then, such a sequence of steps as described above is repeated, and at a point of time after the clock signal CLK falls for the 16th time after such 15 changes of the clock signal CLK, the registers Cij of the third storage block 3 latch the following values therein.

Cij=$\Sigma_k$ a$_{ik}$ b$_{kj}$ where $1 \leq i$, k, $j \leq 4$. Accordingly, a result of the multiplication between the square matrix A and the other square matrix B, that is, [A] . [B] is latched in the third block 6.

Subsequently, a transfer signal φ is produced in response to the 16th falling edge of the clock signal CLK, and a signal rising to the "H" level is produced from the flip-flop 8 in response to such transfer signal φ.

Simultaneously, the shifting signal SHIFT R (C) is changed over to a shifting signal SHIFT C (R) in response to the production of the transfer signal φ. When the clock signal CLK falls for the 16th time, a result of the multiplication of [A]. [B] is stored in the third storage block 6. In order to accomplish orthogonal transformation of data arranged in a two-dimensional array, it is necessary to effect a calculation of [A][B][A]. To this end, [A][B]=[D] stored in the third storage block 6 is transferred to the second storage block 2, and then such multiplications as described above are executed again. To this end, the shifting directions of the first storage block 1 and the second storage block 2 are changed over.

Here, contents of the registers C11 to C44 are transferred in parallel to the second storage block 2 using the transistors TR11 to TR44. Instead, however, such a construction may be employed that the transistors TR11 to TR44 are provided on the input sides of the registers C11 to C44 of the third storage block 6 such that a result of the multiplication may be transferred directly to the second storage block 2 without being written into the registers C11 to C44 in response to a transfer signal φ. In this instance, the transfer signal φ can be produced at a timing earlier by a half clock cycle than the timing shown in the time chart of FIG. 14 Further, after transfer of data in response to the transfer signal φ, contents of the registers Cij are all reset. This is realized, for example, by delivering a result of logical OR of the reset signal RESET and the transfer signal φ to reset inputs of the individual registers Cij.

Further, the clock signal CLK which provides a shifting operation of the storage block 1 and the storage block 2 is set to a value sufficiently lower than the speed at which operation of the arithmetic blocks 4 and 5 may be provided so as to sufficiently assure the calculating speed in the arithmetic blocks 4 and 5.

Now, the matrix [A]·[B] obtained as a result of the multiplication is defined as [D]. In this instance, a multiplication which is to be executed subsequently is [D] [A].

Accordingly, shifting signals produced from the multiplexers 9a and 9b are changed over in response to production of a transfer signal φ. In particular, although the shifting signal SHIFT R has been provided to the first storage block 1 in order to effect a shifting operation in the row direction, a shifting signal SHIFT C for the column direction is provided now. To the contrary, in the second storage block 2, the shifting direction is changed over from the column direction to the row direction. Accordingly, in this instance, changing over from the shifting signal SHIFT C to the shifting signal SHIFT R is effected. Transfer of data from the third storage block 6 to the second storage block 2 is executed by way of the two-input multiplexers 12, included in the second storage block 2. In this instance, the controlling signal delivered to the multiplexer 12, is such that, while the transfer signal φ is held at the "H" level, the multiplexer 12, transfers data from the third storage block 6, as apparently seen from the construction shown in FIG. 6.

In this state, the aforementioned operation is repeated again. In this instance, however, the shifting directions in the storage blocks 1 and 2 are changed over between the column directions and the row direction.

After completion of such transfer operation which is executed after completion of the shifting operations involved in the first multiplication of matrices, such an initial state as shown in FIG. 15B is restored. After data to be provided to the individual registers Aij and Bij are established that is, after the signal φ falls, multiplications and calculations of the data are executed. In particular, in the initialized state for the second time, the diagonal elements Aii, Bii and Cii in the storage blocks 1 and 2 and the third storage block 6 are selected, and accordingly, outputs of the adders ADD1 to ADD4 are specified as follows:

ADD1=a11×d11+c11

ADD2=a22×d22+c22

ADD3=a33×d33+c33

ADD4=a44×d44+c44

Here, since contents of the third storage block 6 are all in a reset state, contents of the registers Cij are all equal to "0". In particular, when the clock signal CLK rises for the 17-th time, outputs of the pointer registers Pij in the final condition shown in FIG. 15A are shifted by one bit in response to the rising edge of the clock signal CLK and only the diagonal elements are in a selected state. Accordingly, only multiplications for the diagonal elements are executed, and results of the multiplications described above are outputted. Here, resetting of the pointer block 4 described hereinabove from the outside of the device is not executed, nor a shifting operation of stored contents of the individual storage registers is effected. This is because, when the clock signal CLK rises for the 17-th time, the output of the counter 71 is "16" and accordingly no shifting operation is executed in the first storage block 1, This can be realized readily, for example, by delivering a transfer signal $\phi$ to the OR gate 72 as shown by a dotted line 80 in FIG. 1. On the other hand, in the second storage block 2, data of results of multiplications provided to the inputs thereof appear at the outputs of the individual registers in response to a rising edge of the clock signal CLK, and the data are selected in accordance with the pointer values of the pointer block in response to a rising edge of the clock signal CLK to the "H" level so that such additions as described above are executed.

When the clock signal CLK subsequently falls to the "L" level, the results of the multiplications are stored into the registers Cii of the diagonal elements of the third storage block 3. Meanwhile, the count value of the hexadecimal counter 71 is incremented by one . Then when the clock signal CLK rises to the "H" level, contents of the registers Aij of the first storage block 1 are shifted by one bit in the column direction. Simultaneously, outputs of the pointer registers Pij of the pointer block 4 are shifted by one bit in the row direction in response to the falling edge of the clock signal CLK. Further in response to the falling edge of the clock signal CLK, multiplications between the selected registers Aij and Bij are executed while corresponding registers C12, C23, C34 and C41 of the third storage block 6 are selected, and the results of the multiplications are added to contents of the registers C12, C23, C34 and C41. Results of such additions are written into registers C12, C23, C34 and C41 in response to a subsequent falling edge of the clock signal CLK. As a result, the following values are stored in the individual registers Cij.

$$C12 = a22 \times d12 + c12$$

$$C23 = a33 \times d23 + c23$$

$$C34 = a44 \times d34 + c34$$

$$C41 = a11 \times d41 + c41$$

When the clock signal CLK falls to the "L" level, the count value of the hexadecimal counter 71 is incremented by one to "2" in response to the falling edge of the clock signal CLK.

When the clock signal CLK subsequently changes to the "H" level, contents of the registers Aij of the first storage block 1 are shifted by one bit in the column direction in response to the rising edge of the clock signal CLK while contents of the pointer registers Pij are also shifted by one bit in the row direction. In this instance, contents of the registers Bij of the second storage block 2 are not shifted and remain in the initialized state. As a result, the registers Aij, Bij and Cij selected by the pointer registers Pij are registers adjacent in the row or column direction to the registers selected at step ② above. Accordingly, the following values are stored into the individual registers C13, C24, C31 and C42.

$$C13 = a33 \times d13 + c13$$

$$C24 = a44 \times d24 + c24$$

$$C31 = a11 \times d31 + c31$$

$$C41 = a22 \times d42 + c42$$

Such storing operation takes place in synchronization with a falling edge of the clock signal CLK, and the count value of the counter 71 is incremented by one to "3" also in response to the falling edge of the clock signal CLK.

Subsequently, when the clock signal CLK rises to the "H" level, outputs of the pointer registers Pij are shifted by one bit in the row direction while at the same time contents of the registers Aij of the first storage block 1 are shifted by one bit in the column direction. Then when the clock signal CLK subsequently rises to the "H" level, contents of the registers Aij of the first storage block 1 are changed to the values indicated below ③ in FIG. 15B. In particular, contents of the registers at the preceding step are shifted by one bit in the column direction while outputs of the pointer registers Pij are also shifted by one bit in the row direction. In this instance, since the count value of the hexadecimal counter 71 is still "3", contents of the registers Bij of the second storage block 2 are not changed. Accordingly, the registers C14, C21, C32 and C43 included in the third storage block 6 are selected by the pointer registers Pij and contents thereof are read out therefrom while results of additions at the adders ADD1 to ADD4 are stored into the registers C14, C21, C32 and C43. As a result, the following values are stored in the individual registers C14, C21, C32 and C43.

$$C14 = a44 \times d14 + c14$$

$$C21 = a11 \times d21 + c21$$

$$C32 = a22 \times d32 + c32$$

$$C43 = a33 \times d43 + c43$$

The count value of the hexadecimal counter 71 is incremented by one to "4" in response to a falling edge of the clock signal CLK to the "L" level.

Then when the clock signal CLK changes to the "H" level, contents of the first storage block 1 are not shifted because no shifting signal is delivered to the first storage block 1. To the contrary, a shifting signal SHIFT R for the second storage block 2 appears at an output of the OR gate 72 in response to the rising edge of the clock signal CLK so that contents of the registers Bij of the storage block 2 are shifted by one bit in the row direction. A shifting signal SHIFT for the pointer block 3 is produced in response to the clock signal CLK so that contents of the pointer block 3 are shifted by one bit in the row direction. As a result, contents of the registers Aij and Bij and the pointer registers Pij are changed to such values as indicated at ④ in FIG. 15B. Consequently, outputs of the adders ADDi are given as follows:

ADD1=a41×d14+c11

ADD2=a12×d21+c22

ADD3=a23×d32+c33

ADD4=a34×d43+c44

The outputs of the individual adders ADD1 to ADD4 are latched in the registers C11, C22, C33 and C44 included in the third storage block 6 in response to subsequent transition to the "L" level of the clock signal CLK while the count value of the hexadecimal counter 71 is incremented by one to "5".

After then, as such steps as described above are repeated, registers Cij included in the third storage block 6 are repetitively selected, and results of multiplications are added to the contents of the selected registers Cij, and then, results of such additions are stored into the selected registers Cij. As a result, at a point of time after the clock signal CLK falls for the 16th time after such 15 changes of the clock signal CLK in the multiplication of matrices for the second time, the registers Cij of the third storage block 3 latch the following values therein.

Cij=$\Sigma_k$ a$_{kj}$ d$_{ik}$ where $1 \leq i, k, j \leq 4$. Accordingly, results of the multiplication between the square matrix D and the square matrix A, that is, [D].[A] are latched in the third block 6.

Accordingly, as a result of such calculations as described above, a result of the orthogonal transformation of the two-dimensionally arrayed data matrix [B] with the coefficient matrix [A] for orthogonal transformation is stored in the third storage block 6.

It is to be noted that, if shifting operations in the column direction and the row direction are reversed in the operation described above, then the calculating sequence can be changed from that described above, and also in this instance, orthogonal transformation can be made in a similar manner.

In addition, in the above described embodiment, the pointer shifts its selection position in response to every issued clock signal. However, alternative pointer operation may be employed as shown in FIGS. 16A through 16C.

In FIGS. 16A through 16C, the matrices A, B and C are each formed of 3×3 matrix. Referring to FIG. 16A, from the step 1 to the step 3, the elements of the matrix A are shifted in the row direction in response to the shift clock (row shift clock). The matrix B does not cause shifting of the elements b11 to b33. The pointer shifts its selection points in the row direction in response to the pointer shift clock.

The resultant product of the matrix elements selected by the pointer is stored in the respective storage elements (shown as C in FIGS. 16A to 16C).

Referring FIG. 16B, at the step 4, the elements of the matrix A are shifted in the row direction in response to the row shift clock to return to the original positions. The elements of the matrix B are shifted by one row in the column direction in response to the column shift clock. However, at the step 4, the pointer does not shift the selection points to hold the selection points as selected at the step 3. Then the product of the matrix elements selected by the pointer is stored in the storage element C. Then, the process proceeds to the steps 5 and 6. In the steps 5 and 6, the elements of the matrix A and the selection points of the pointer are shifted in the row direction in response to the shift clocks, while the elements of the matrix B do not shift. Referring to FIG. 16C, at the step 7, the elements of the matrix B are shifted in the column direction and the matrix A shifts the elements in the row direction, while the pointer does not shift the selection points, as at the step 4. Finally, at the step 9, the storage unit C stores the product of the matrices A and B. Then, the stored data in the unit C are transferred to the storage unit B. Then, the process of the steps 1 through 9 are again executed. It should be noted that in the second calculation process respective shifting directions of the matrices A and B are changed over from those in the first calculation process.

Further, while in the embodiment described above the square matrix for orthogonal transformation and the two-dimensionally arrayed data are described as in the form of a square matrix of 4 rows and 4 columns consisting of data arrayed in a square lattice and a square matrix of 4 rows and 4 columns for orthogonal transformation, respectively, the data matrix and the matrix for orthogonal transformation are not limited to such a construction of 4 rows and 4 columns and may generally be any other square matrix of n rows and n columns. In this instance, the counter output should be that of an n-array counter, and counter outputs of n, 2n, 3n, ... may be used for a shifting signal SHIFT for providing individual shifting timings.

It is also to be noted that, in the construction described above, data to be stored into each register is not limited to one bit but may be composed of a plurality of bits (n bits). In this instance, each signal line should have an n-bit width.

As described in the foregoing, according to the present invention, the circuit device can be made in a compact construction and can execute orthogonal transformation of two-dimensional data arranged in a square matrix at a high speed.

Further, where each of the first, second and third storage means includes storage elements arranged in a square matrix while the pointer means is formed from pointer registers arranged in a similar square matrix, the individual means have a high coupling property in a vertical direction to each other, and accordingly, if a storage means block, a pointer means block, an adding means block and a multiplying means block are layered in the vertical direction on a semiconductor substrate, the circuit device can be realized with wires of a minimized length and a minimized number.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A circuit device for orthogonal transformation of two-dimensional discrete data arranged in a square matrix of n rows and n columns, n being a natural number, comprising:

first storage means including a plurality of storage elements for storing individual elements of a coefficient matrix for orthogonal transformation in one to one correspondence therein, the coefficient matrix being a square matrix of n rows and n columns, second storage means including a plurality of storage elements for storing data arranged in a square matrix of n rows and n columns in the one to one correspondence basis therein, third storage means including a plurality of storage elements for storing therein a result of a multiplication between the data matrix stored in said second storage means and the coefficient matrix stored in said first storage means, the result of the multiplication providing a square matrix of n rows and n columns, said storage elements of said third storage means storing the result of the multiplication in the one to one correspondence basis therein, pointer means for producing information of a position of one of said storage elements included in said first storage means in which an element of the coefficient data in the i-th row and the k-th column is to be stored, i being an integer equal to or greater than 1 and equal to or smaller than n, k being an integer equal to or greater than 1 and equal to or smaller than n, information of a position of one of said storage elements included in said second storage means in which an element of said array data in the k-th row and the l-th column is to be stored, k being an integer greater than 1 and equal to or smaller than n, l being equal to or greater than 1 and equal to or smaller than n, an information of position of one of said storage elements included in said third storage elements in which an element of a matrix of a result of a multiplication in the i-th row and the l-th column is to be stored, multiplying means operable in response to position information produced from said pointer means for reading and multiplying information of those of said storage elements of said first and second storage means specified by said pointer means, adder means for reading information of ones of said storage elements of said third storage means specified by said pointer means, adding a result of the multiplication by said multiplying means to the data read out from the specified storage element of said third storage means, and storing a result of the addition into the specified storage element of said third storage means.

2. A circuit device according to claim 1, further comprising means for transferring all of the results of the multiplication stored in said third storage means at a time to said second storage means, said transferring means transferring data of the results of the multiplications on the one to one correspondence basis to the individual storage elements of said second storage means.

3. A circuit device according to claim 1, wherein each of said first, second and third storage means includes a plurality of storage elements arranged in a square matrix of n rows and n columns.

4. A circuit device according to claim 1, wherein each of said first and second storage means includes a plurality of shift registers which are capable of making a shifting operation in the column direction and also in the row direction, and said device further comprises means for providing a shifting signal to said first and second storage means to cause one of said first and second storage means to make a shifting operation in the row direction when the other of said first and second storage means makes a shifting operation in the column direction.

5. A circuit device according to claim 1, further comprising means operable in response to completion of shifting operations for one row of one of said first and second storage means for shifting the other of said first and second storage means by one bit in the column direction.

6. A circuit device according to claim 5, wherein a shifting operation of said pointer means is effected in a synchronized relationship to shifting operations of said first and second storage means.

7. A circuit device according to claim 1, wherein said pointer means includes a plurality of shift registers arranged in n rows and n columns and each formed from n-stage unit shift registers which are capable of making a shifting operation in the row direction, and said pointer means is reset such that outputs of only those unit shift registers corresponding to diagonal elements are in an activated state in an initialized condition.

8. A circuit device according to claim 1, wherein said first, second and third storage means, said multiplying means and said adder means are layered in a predetermined order in a vertical direction on a semiconductor substrate so as to provide a three-dimensional device structure.

9. A circuit device according to claim 1, wherein said multiplying means and said adder means are provided for each row of said first and second storage means and multiply and add outputs of selected ones of said storage elements of said first and second storage means.

10. A circuit device according to claim 1, wherein said first and second storage means make shifting operations such that, after completion of n shifting operations of said first storage means in the row or column direction, such shifting operation is stopped once while a shifting operation of said second storage means is executed in the column or row direction.

11. A method of orthogonally transforming a two-dimensional data array arranged in a square matrix of n rows and n columns with a coefficient matrix of n rows and n columns for orthogonal transformation, n being a natural number, comprising the steps of:

writing the coefficient matrix for orthogonal transformation into a first storage block including a plurality of storage elements arranged in a square matrix of n rows and n columns and each element capable of making a shifting operation in the column direction and also in the row direction;

writing the two-dimensional data array into a second storage block including a plurality of storage elements arranged in a square matrix of n rows and n columns and each element cable of making a shifting operation in the column direction and also in the row direction;

resetting a pointer block including registers arranged in a square matrix of n rows and n columns and cable of making a shifting operation in the row direction such that only diagonal ones of the elements of the matrix of said pointer block may output an activating signal;

reading and multiplying contents of said first and second storage means in response to an activating signal from said pointer block;

reading contents of storage elements of a third storage block in response to the activating signal from said pointer block, adding the thus read-out contents to a result of the multiplication, and writing a result of such addition to the selected ones of said storage elements of said third storage block, said third storage block including a plurality of storage elements arranged in n rows and n columns;

shifting contents of said storage elements of said first storage block by one step in the row or column direction and then shifting contents of said registers of said pointer block by one step in the row direction;

reading and multiplying, in response to the activating signal from said pointer block, contents of the corresponding ones of said storage elements of the corresponding one of said first and second storage blocks;

adding the result of such multiplication to contents of those of said storage elements of said third storage block selected in response to the activating signal from said pointer block and writing a result of such addition to the selected ones of said storage elements of said third storage block;

repeating the multiplying and adding steps by n times, and stopping, after completion of such repetition, a shifting operation of said first storage block while a shifting operation is effected by one step in the column or row direction in said second storage block and the pointer output of said pointer block is shifted by one step in the row direction, one of said first and second storage means storage blocks being adapted to make a shifting operation in the column direction while the other makes a shifting operation in the row direction;

repeating the multiplying and adding steps in response to an output of said pointer block;

transferring, after completion of the matrix calculation as a result of execution of the calculating steps by n×n times, contents of said third storage block to said second storage block; and repeating the multiplying and adding steps, wherein said first and second storage blocks make shifting operations in the direction different from shifting operations in the preceding shifting operation.

12. In a circuit capable of performing multiplication of matrices of order n, where n is natural number, having at least three sets of storage registers and a set of pointer registers, each being electrically arranged in the form of a matrix of order n, a method comprising the steps of:

a. specifying n quantities in corresponding positions in each of a first matrix, a second matrix and a third matrix with said pointer registers, b. multiplying respective ones of said n quantities in said first matrix specified in step a. by respective ones of said n quantities in said second matrix specified in step a., c. accumulating, by addition, the results of said multiplying steps in a corresponding portion of said third matrix pointed to in step 1., d. shifting the quantities stored in said first matrix by one register in one coordinate direction, e. shifting the contents of said pointer registers by one register, f. repeating steps a. through e. n−1 times, g. shifting the quantities stored in said first matrix by one register in said one coordinate direction and shifting the quantities stored in said second matrix by one register in another coordinate direction h. repeating steps a. through g. n−2 times, and i. repeating steps a. through e. n times.

13. The method of claim 12 including the further step of j. transferring said accumulated results to said second matrix.

14. The method of claim 13 including the further step of k. repeating step g.

15. The method of claim 14 including the further step of repeating steps a. through i., wherein, during the repetition of steps a. through i., the directions of said one and said another coordinate directions are orthogonal to the directions of said one and said another coordinate directions prior to the performance of step j.

16. In a circuit capable of performing multiplication of matrices of order n, where n is a natural number, having at least three sets of storage registers and a set of pointer registers, each being electrically arranged in the form of a matrix of order n, a method comprising the steps of:

a. specifying n quantities in corresponding positions in each of a first matrix, a second matrix and a third matrix with said pointer registers, b. multiplying respective ones of said n quantities in said first matrix specified in step a. by respective ones of said n quantities in said second matrix specified in step a., c. accumulating, by addition, the results of said multiplying step in a corresponding portion of said third matrix pointed to in step a., d. shifting the quantities stored in said first matrix by one register in one coordinate direction, e. shifting the contents of said pointer registers by one register, f. repeating steps a. through e. n−1 times, g. shifting said pointer by one register and shifting the quantities stored in said second matrix by one register in another coordinate directions, h. repeating steps a. through g. n−2 times, and i. repeating steps a. through e. n times.

17. The method of claim 16 including the further step of j. transferring said accumulated results to said second matrix.

18. The method of claim 17 including the further step of k. repeating step g.

19. The method of claim 18 including the further step of repeating steps a. through h., wherein, during the repetition of steps a. through h., the directions of said one and said another coordinate directions are orthogonal to the directions of said one and said another coordinate directions prior to the performance of step j.

* * * * *